United States Patent
Sankaran et al.

(10) Patent No.: US 9,582,230 B1
(45) Date of Patent: Feb. 28, 2017

(54) METHOD AND SYSTEM FOR AUTOMATED FORM DOCUMENT FILL-IN VIA IMAGE PROCESSING

(71) Applicant: Xerox Corporation, Norwalk, CT (US)

(72) Inventors: Venkata Ragavan Kondalam Sankaran, Tamil Nadu (IN); Ashok Raj Anbalagan, Tamil Nadu (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/879,691

(22) Filed: Oct. 9, 2015

(51) Int. Cl.
| | |
|---|---|
| H04N 1/00 | (2006.01) |
| G06F 3/12 | (2006.01) |
| H04N 1/56 | (2006.01) |
| G06K 9/00 | (2006.01) |

(52) U.S. Cl.
CPC .......... *G06F 3/1243* (2013.01); *G06F 3/1204* (2013.01); *G06F 3/1292* (2013.01); *G06K 9/00449* (2013.01); *H04N 1/00307* (2013.01); *H04N 1/00411* (2013.01); *H04N 1/00413* (2013.01); *H04N 1/56* (2013.01); *H04N 2201/0094* (2013.01)

(58) Field of Classification Search
USPC .................................. 358/1.16, 1.6
See application file for complete search history.

(56) References Cited

U.S. PATENT DOCUMENTS

| | | | |
|---|---|---|---|
| 6,396,951 B1 | 5/2002 | Grefenstette | |
| 6,868,411 B2 | 3/2005 | Shanahan | |
| 2002/0095444 A1* | 7/2002 | Mantaro | G06F 17/211 715/209 |
| 2003/0084002 A1* | 5/2003 | Ericson | G06K 9/00154 705/67 |
| 2005/0128181 A1* | 6/2005 | Wang | G06K 9/00436 345/156 |
| 2007/0239504 A1 | 10/2007 | Austin et al. | |
| 2009/0127006 A1* | 5/2009 | Lynggaard | G06F 3/03545 178/19.01 |
| 2010/0251089 A1* | 9/2010 | Cole | G06F 17/246 715/212 |
| 2013/0329247 A1* | 12/2013 | Takabatake | H04N 1/00408 358/1.15 |
| 2014/0065594 A1 | 3/2014 | Venable | |
| 2014/0118560 A1 | 5/2014 | Bala et al. | |

(Continued)

FOREIGN PATENT DOCUMENTS

| | | |
|---|---|---|
| EP | 0585074 A2 | 3/1994 |
| EP | 1887478 A1 | 2/2008 |

*Primary Examiner* — Jerome Grant, II
(74) *Attorney, Agent, or Firm* — Fox Rothschild LLP

(57) ABSTRACT

A fill-in form document completion system includes a processing device, an image capturing device, and a document generation device. The image capturing device generates an image file of a printed form having at least one fill-in field that contains a handwritten symbol within a field boundary. The processing device will process the image file to identify a fill-in field on the printed form and the handwritten symbol that is contained within the identified fill-in field. The processing device will then retrieve a candidate value that corresponds to the identified handwritten symbol, insert the candidate value in the identified fill-in field, and cause the document generation device to generate a document comprising the form with the selected candidate value displayed in the identified fill-in field.

25 Claims, 7 Drawing Sheets

(56) References Cited

U.S. PATENT DOCUMENTS

| | | |
|---|---|---|
| 2014/0201102 A1 | 7/2014 | Srinivasan et al. |
| 2015/0054975 A1 | 2/2015 | Emmett et al. |
| 2015/0205777 A1 | 7/2015 | Campanelli et al. |
| 2016/0078277 A1* | 3/2016 | Sprigg ............... G06K 9/00174 382/119 |

* cited by examiner

| Last name | Smith |
|---|---|
| First name | Michael |
| School name | |
| School code | |
| Student ID | |
| Course #1 | Campus / Year |
| | UCAS Course Code |
| Course #2 | a. |
| Course #3 | b. |
| Date of birth | Day 15 / Month 09 / Year 91  Sex M/F |
| Signature | Citizenship United States |

FIG. 4B

| FIELD MARK 501 | CATEGORY 502 |
|---|---|
| △ | TRIANGLE REPRESENTS FIRST NAME |
| ▷ | INVERTED TRIANGLE REPRESENTS LAST NAME |
| ○ | CIRCLE REPRESENTS DATE OF BIRTH |
| ⇧ | ARROW MARK REPRESENTS CITIZENSHIP |

FIG. 5

METHOD AND SYSTEM FOR AUTOMATED FORM DOCUMENT FILL-IN VIA IMAGE PROCESSING

BACKGROUND

Countless situations exist in which people must fill out various forms in order to receive certain information or services. The forms may include department of motor vehicle forms, healthcare-related forms, employment applications, taxing authority forms and the like. While many applications have moved online, those that have moved online still require the user to manually enter the data into various fields. Manual filling of forms can tedious, especially on mobile electronic devices that have small display screens and limited keyboard entry capabilities.

One solution to automate form-filling that has been used in the non-mobile environment is to download software, such as a "wallet" or "form-filler", onto a user's device. The software may be installed as a plug-in on top of the user's browser software. A typical conventional form-filler operates by guessing at matches among fields in a form, which are to be filled-in, and corresponds with a wallet, which is a file that contains information that may be used to fill-in the form fields. However, for these systems to work properly, the system must have a template of the form, or a user must identify the fields so that the system can assign them to a template.

This document describes devices and methods that are intended to address issues discussed above and/or other issues.

SUMMARY

In an embodiment, a fill-in form document completion system may include a processing device, an image capturing device, and a document generation device. The image capturing device, which may be part of the document generation device or part of a separate electronic device, may generate or otherwise provide an image file of a printed form having at least one fill-in field that contains a handwritten symbol within a field boundary. The processing device, which may be part of the document generation device, part of the separate electronic device or part of a remote server, will process the image file to identify a fill-in field on the printed form and the handwritten symbol that is contained within the identified fill-in field. The processing device will then retrieve a candidate value that corresponds to the identified handwritten symbol, insert the candidate value in the identified fill-in field, and cause the document generation device to generate a document comprising the form with the selected candidate value displayed in the identified fill-in field.

In some embodiments, the document generation device may communicatively connect to a proximate user mobile device and access a data file from the proximate user mobile device. The data file comprises a plurality of categories of fill-in fields and stored values for the categories. When retrieving the candidate value, the system use the data file to identify a category that corresponds to the handwritten symbol. The system may extract the stored value for the identified category from the data file and use the extracted stored value as the candidate value. Optionally, when retrieving the candidate value, if there are multiple candidate values that correspond to the identified handwritten symbol, the system may display the candidate values in a pop-up menu display sector of a display device of one of the electronic devices so that a user can select one of the candidate values. When the system receives, via a touch sensor module of the display device in the pop-up menu display sector, a user selection of one of the candidate values, it will use the selected value as the retrieved candidate value.

In various embodiments, when processing the image file to identify the identified fill-in fields on the printed form, the system may process the image file to identify an area having a non-alphanumeric symbol and a background of a color that corresponds to a known fill-in field color. It may then identify a boundary of the area as the field boundary.

In some embodiments, the image capturing device may capture an image of the printed form and save the image as the image file in a computer-readable memory device.

In some embodiments, the document generation device may comprise the processing device. If so, then when causing the document generation device to generate the document comprising the form with the selected candidate value displayed in the identified fill-in field, the processing device may generating an updated image file configured to cause a display device to display the form with the selected candidate value displayed in the identified fill-in field. In addition or alternatively, the processing device may generate a print file configured to cause the print device to print to a substrate the form with the selected candidate value displayed in the identified fill-in field.

In some embodiments, the image capturing device may be an image scanner, the document generation device may be a print device, and the image scanner and print device may be components of a multifunctional device. The image scanner may capture the image of the printed form. The processing device may generating the image file from the captured image and cause the print device to print the form to a substrate with the selected candidate value displayed in the identified fill-in field. Optionally, if substrate includes the printed form, the print device may also remove the handwritten symbol from the fill-in field by erasing or overwriting the handwritten symbol.

Optionally, if the electronic device further includes a touch-sensitive display device, then after processing the image file and before retrieving the candidate value the system may cause the touch-sensitive display device to display the printed form. A user may select, and the system may receive via the touch-sensitive display device, a user selection of the identified fill-in field so that when retrieving the candidate value that corresponds to the identified handwritten symbol, the processing device does so in response to receiving the user selection of the identified fill-in field.

BRIEF DESCRIPTION OF THE DRAWINGS

FIG. 1 is an example of a section of a form document having fill-in fields.

FIGS. 4A and 4B illustrate an example of a fill-in form before and after candidate values are inserted in the form's fill-in fields.

FIG. 5 illustrates an example of a table correlating handwritten values to categories of data.

DETAILED DESCRIPTION

Figure 2:
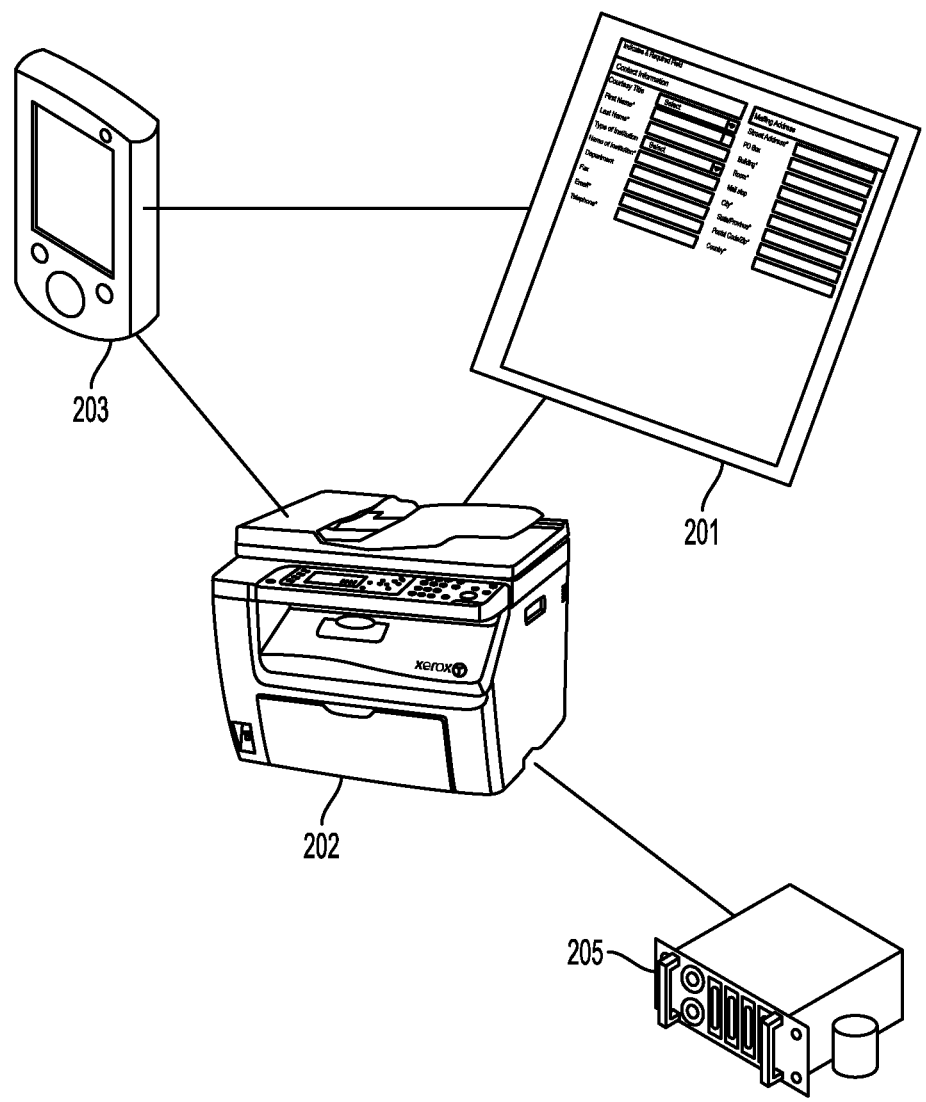
FIG. 2 depicts example components of a system for image processing a fillable form document.

This disclosure is not limited to the particular systems, methodologies or protocols described, as these may vary.

The terminology used in this description is for the purpose of describing the particular versions or embodiments only, and is not intended to limit the scope.

As used in this document, any word in singular form, along with the singular forms "a," "an" and "the," include the plural reference unless the context clearly dictates otherwise. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used herein, the term "comprising" means "including, but not limited to."

For the purposes of this document, a "form" refers to one or more printed artifacts containing a combination of text and/or images as well as blank fields that are to receive data. For example, a form may be a government-issued form such as a department of motor vehicle or taxing agency form, a healthcare-related form, an employment application, a financial account application, an educational institution application and the like.

In this document, the term "electronic device" refers to a device having a processor and a non-transitory, computer-readable medium (i.e., memory). The memory may contain programming instructions in the form of a software application that, when executed by the processor, causes the device to perform one or more processing operations according to the programming instructions. An electronic device also may include additional components such as a touch-sensitive display device that serves as a user interface, as well as a camera or other image capturing device. An electronic device also may include one or more communication hardware components such as a transmitter and/or receiver that will enable the device to send and/or receive signals to and/or from other devices, whether via a communications network or via near-field or short-range communication protocols. Examples of electronic devices include smartphones, smart watches, digital cameras, tablet computing devices, electronic readers, personal computers, multifunction devices, fitness tracking devices, wearable electronic devices, media players, satellite navigation devices and the like.

An "image capturing device" or "imaging device" refers to any device having one or more image sensors capable of optically viewing an object and converting an interpretation of that object into electronic data. One such example of an imaging device is a digital camera.

The terms "multifunction printer" (or "MFP") and "multifunction device" ("MFD") refer to a machine having hardware and associated software configured to enable the device to print documents on substrates, as well as perform at least one other function such as copying, facsimile transmitting or receiving, image scanning, or performing other actions on document-based data.

This document describes a system by which a electronic device will capture or otherwise receive an image of a printed form document, use image processing to recognize the form's data entry fields, and automatically fill at least some of those fields with available data. Various embodiments of the system may operate on any type of fillable form, without access to a preexisting template, or without prior knowledge of coordinates of various fields on the form.

Figure 1:
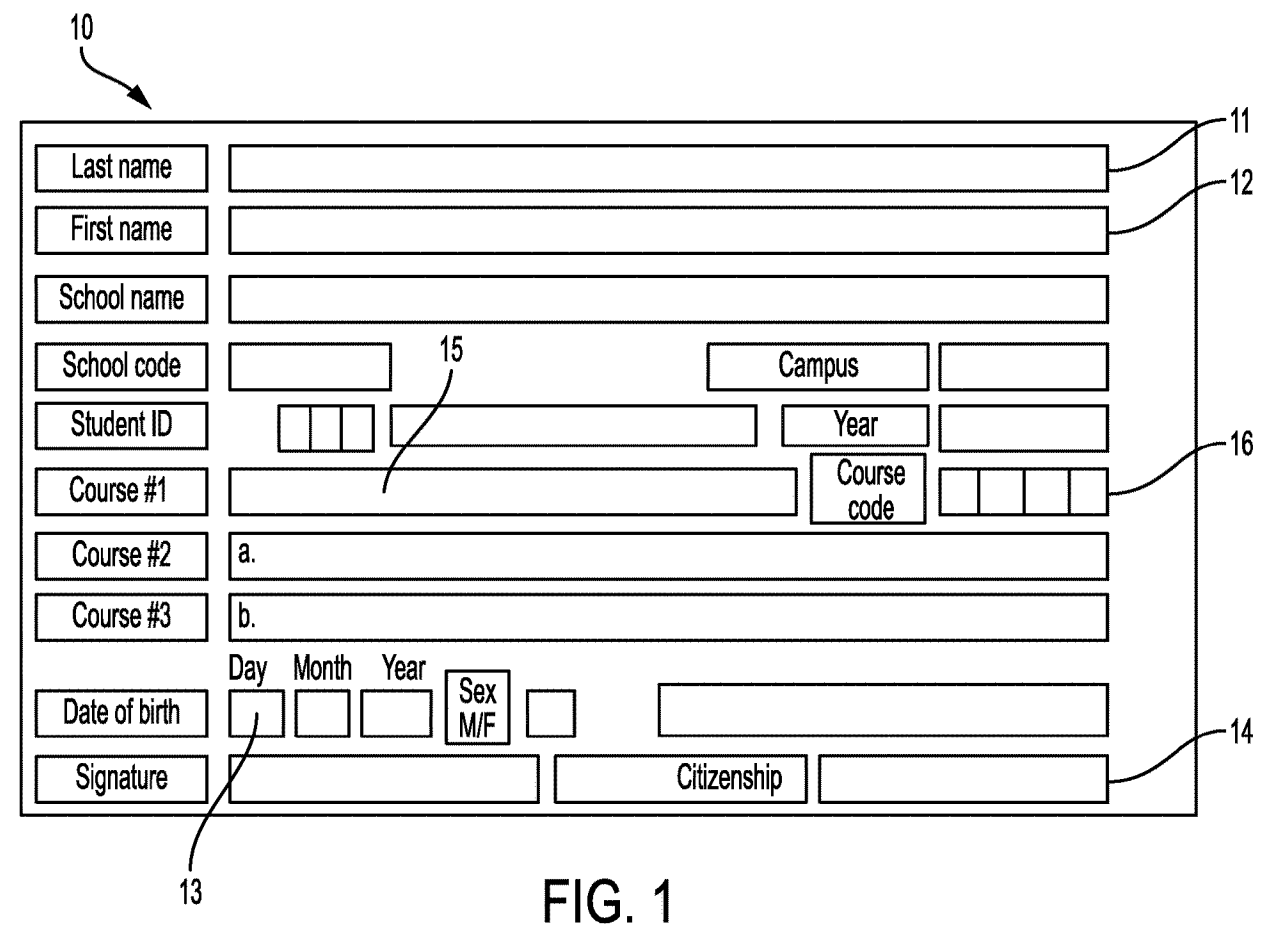

FIG. 1 illustrates an example of a section of a form document 10 having fill-in fields. The document 10 includes content printed on a substrate, where the content includes fill-in fields on which a user of the document is to provide data. The example shown in FIG. 1 is a portion of a college application on which the user is to provide personal information. In this example, the fill-in fields are identified by border lines and by background colors that differ from the background color of other portions of the document. However, other visually perceptible or non-visually perceptible markings may be used to denote a fill-in field. The fields in this example are marked to receive a set of constant information. Constant information is information that typically will not change for a given user of the form (or at least which are not likely to change on a frequent basis). Examples of constant information fields include fields for the entry of personally identifying information, such as a field for the user's last name (surname) 11, a field for the user's first (or given) name 12, fields for the user's date of birth 13, and fields for the user's country of citizenship 14. The form also may include fill-in fields that are marked to receive dynamic information. Dynamic information is information that is typically specific to the form and which is not likely to be needed—or which if needed is likely to change—on other forms that are designed for other purposes. In the example of FIG. 1, dynamic information fields include a field for a course of study that the user is applying for 15, and fields for a 4-digit code 16 that is associated with the proposed course of study.

FIG. 2 illustrates example components of a system for image processing a fillable form document and performing automated form-fill in. The system may process the document 201 using a print device 202 such as an MFD, along with an optional user electronic device 203 such as a mobile electronic device. Image capturing components in the MFD 202 such as a scanner, or in the electronic device 203 such as a digital camera, may capture the image and create the image file of the document 201. The system may store the image file, either temporarily or for a longer period of time, in a computer-readable memory component of any of the devices in the system.

The MFD 202 and electronic device 203 may be communicatively connected via one or more communication protocols, such as via a Wi-Fi network, via another communication network such as the Internet or a mobile phone network, or using a short-range or near-field communications protocol such as Bluetooth, Bluetooth Low Energy, radio frequency identification (RFID) or other protocols. The MFD 202 also may be able to access a data storage facility on the electronic device 203 or a remote server 205 with a data store using one or more communications links such as those described above. Various steps of the process described below may be performed by the processing device of the MFD 202, of the electronic device 203, of the remote server 205, or via a combination of any of these components. Similarly, data and programming instructions that the system uses to perform the methods described below may be stored on computer-readable media contained within any combination of these devices and/or other devices to which any of the devices are directly or indirectly communicatively connected. Thus, the system may operate using programming instructions stored as a local mobile device application, a software application on the MFD, or on the remote server (with a browser or other thin client on the local device).

Figure 3:
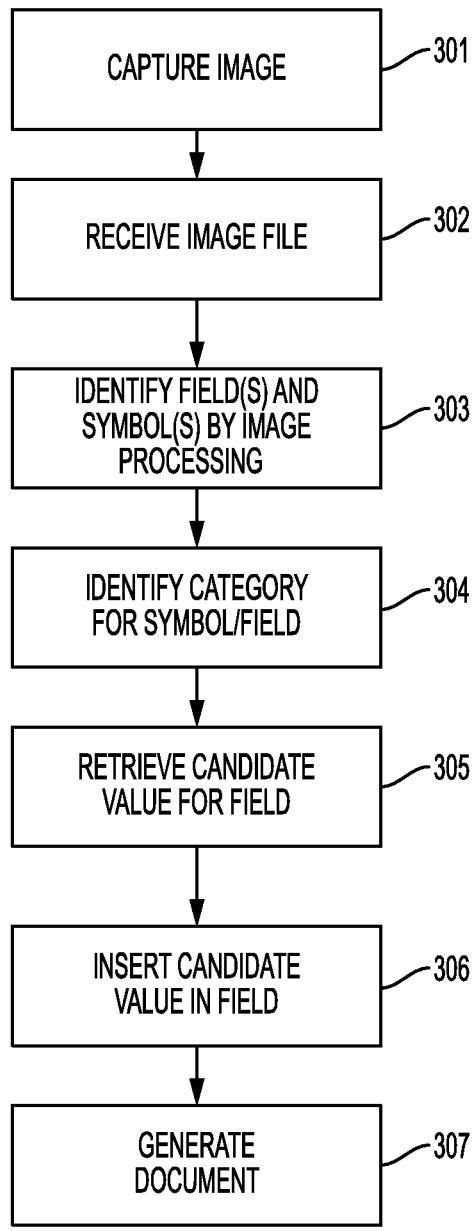
FIG. 3 depicts an example process flow.

FIG. 3 illustrates a sample process flow that a system may follow for receiving an image of a fillable form and performing automated form fill-in via electronic form retrieval. An electronic device will receive an image file of a printed form 302. The device may receive the image via an electronic communication system. If the device or another device within the system includes an image capturing device such as a camera or scanner, the image capturing device may capture the image 301 of the printed form and save the image as the image file in a computer-readable memory device. The system may store the image file in any suitable image format, such as PDF, PowerPoint, JPEG, TIFF, or other formats. The output file may be saved to a data storage facility, such as a memory of the mobile electronic device, of the MFD, or of a remote server.

Figure 4A:
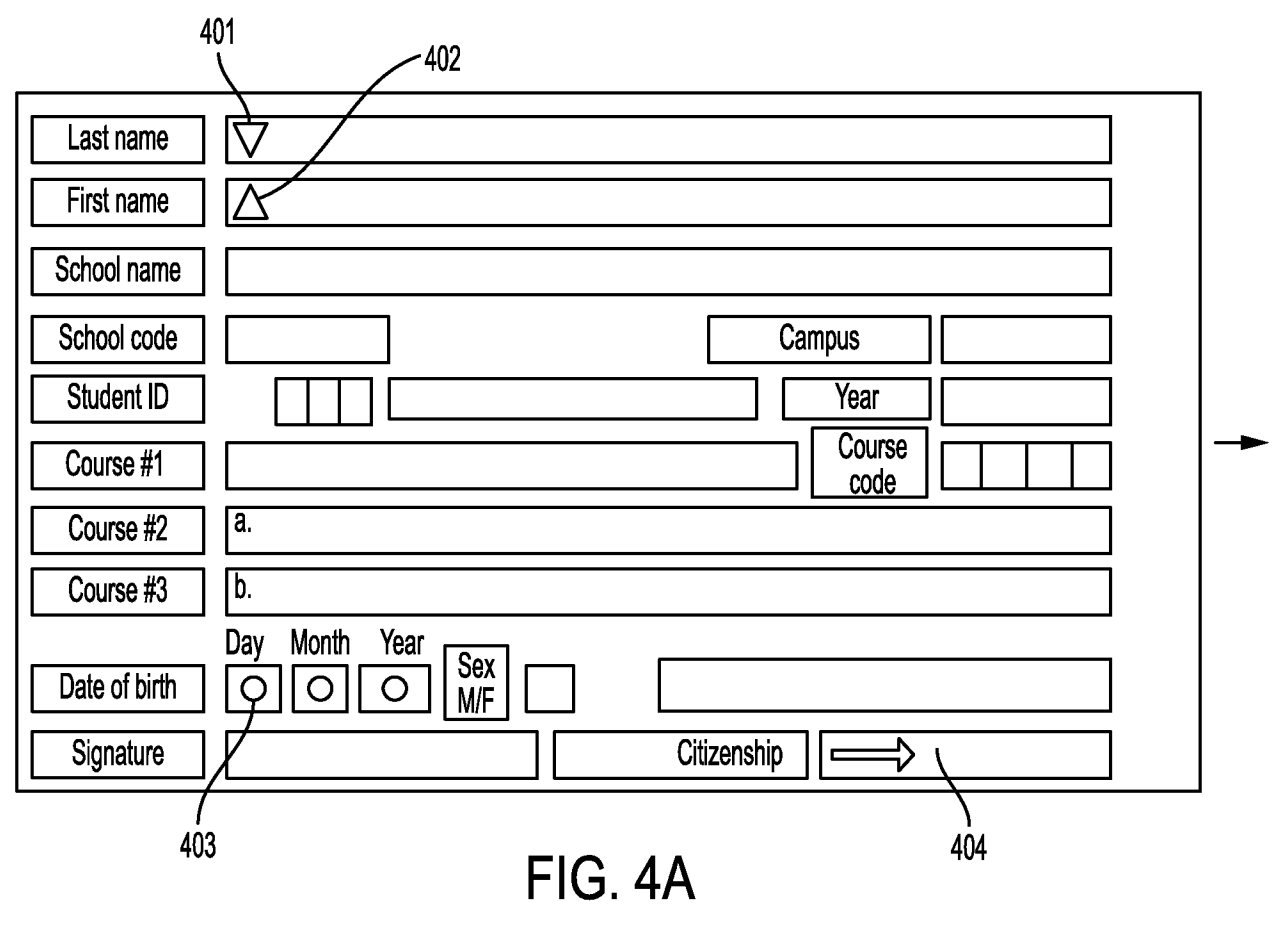

The printed form will have at least one fill-in field that contains a handwritten symbol within a field boundary. An example of this is shown in FIG. 4A, in which the form of FIG. 1 includes various handwritten symbols 401, 402, 403, 404 in the constant data fields corresponding to a person's surname, first name, data of birth, and country of residence. (The meanings of these example symbols will be discussed below.)

Returning to FIG. 3, the processing device will use an image processing function to process the image file 303 and automatically identify one or more of the fill-in fields on the printed form and the handwritten symbol that is contained within each identified fill-in field. The image analysis function may include the performance of image processing methods such as pattern recognition to identify one or more known symbols or field name, the use of edge detection techniques to identify bounded or unbounded blank areas, color recognition processes to identify areas on the document having a background of a color that is known to correspond to a fill-in field, and/or other image analysis techniques. The image processing function also may include one or more pre-processing functions to align the image and/or correct other image capturing defects and external influences. Such pre-processing operations may include, for example, perspective correction, automatic cropping, image enhancement, skew and orientation adjustments, image binarization or other processing techniques to improve the resolution or clarity of the image. Any now or hereafter known image processing technique for the processes listed above may be used in this image processing step. In this way, the system may operate on any form having fill-in fields, even if the system has no template or other pre-existing information that describes coordinates of the fields on the form.

After the processing device identifies a fill-in field and its associated handwritten symbol, the processing device will access one or more data sets in one or more data storage facilities, in which the data sets stores correlations between categories and symbols, as well as one or more candidate values for each category. The processing device will use the handwritten symbol marked on the form and access the data set to identify a category 304 that is associated with the symbol (and thus also the field). The system will then extract (i.e., retrieve) a candidate value 305 that corresponds to the category that the data set indicates is associated with the symbol.

For example, to retrieve the category that is associated with a symbol, the MFD, the electronic device, or the server's data storage facility may include a look-up table or other data structure that associates a handwritten symbol with a category of data. An example of such a table is shown in FIG. 5, which shows the association between each of various symbols 501 (triangle, inverted triangle, circle, arrow, etc.) with various categories 502 of data (first name, last name, date of birth, address or other location, etc.). The associations shown in FIG. 5 are by way of example only; other symbol and category associations may be used.

The candidate values for each category may be stored in a data storage facility on the user's electronic device, such as in a file containing user profile data. Returning to FIG. 3, the processing device may extract the candidate values from the profile (or other data structure) and automatically insert the candidate value in the identified fill-in field 306 and cause a document generation device to generate a document 307 comprising the form with the selected candidate value displayed in the identified fill-in field.

In some embodiments, when the data set(s) for the category/candidate value associations are stored on the user's mobile electronic device, and when user's the mobile electronic device is within a communications range of a communications component of the MFD (or of other electronic device doing the processing), then to retrieve the candidate value 305 the processing device of the MFD (or other electronic device) may communicatively couple with the proximate mobile electronic device and accessing the data file on the proximate device. The communicative coupling may be through any suitable communications protocol, such as near-field or other short range communications protocols, or via a local area or Wi-Fi network. Upon coupling and accessing the data file and identifying a category that corresponds to the handwritten symbol, the processing device may extract the stored value for the identified category from the data file and use the extracted stored value as the candidate value.

In some embodiments, when retrieving the candidate values 305 the processing device may find that the data set includes more than one candidate value for the field. If so, then when as part of the process of inserting the candidate value into the field 306 the system may displaying the multiple candidate values in a pop-up menu display sector of a display device of the electronic device. When a touch sensor module of the display device detects receipt of a user selection of one of candidate values in the pop-up display sector, it will insert the selected candidate value into the field.

Optionally, if the processing device is a component of the document generation device, then the process of generating the document 307 that is the form with the selected candidate value displayed in the identified fill-in field may include generating an updated image file configured to cause a display device to display the form with the selected candidate value displayed in the identified fill-in field. The display device may be part of the MFD, of the user electronic device, or of another document generation device.

If the document generation device has print capability and this is (or includes) a print device, then the process of generating the document 307 that is the form with the selected candidate value may include generating a print file configured to cause the print device to print, on a substrate, the form with the selected candidate value displayed in the identified fill-in field.

Optionally, the document generation device may be part of an MFD that also includes the processing device, an image scanner and a print device. If so, then the image scanner may capture the image of the printed form (step 301), by the processing device may generate the image file from the captured image (step 302), and the MFD may generate the document (step 307) to be printed on a substrate by the print device. Optionally, the substrate may include substrate comprises the printed form. If so, then before or when printing the content for the fill-in field the system may cause the print device to remove the handwritten symbol from the fill-in field by erasing or overwriting the handwritten symbol.

Figure 6:
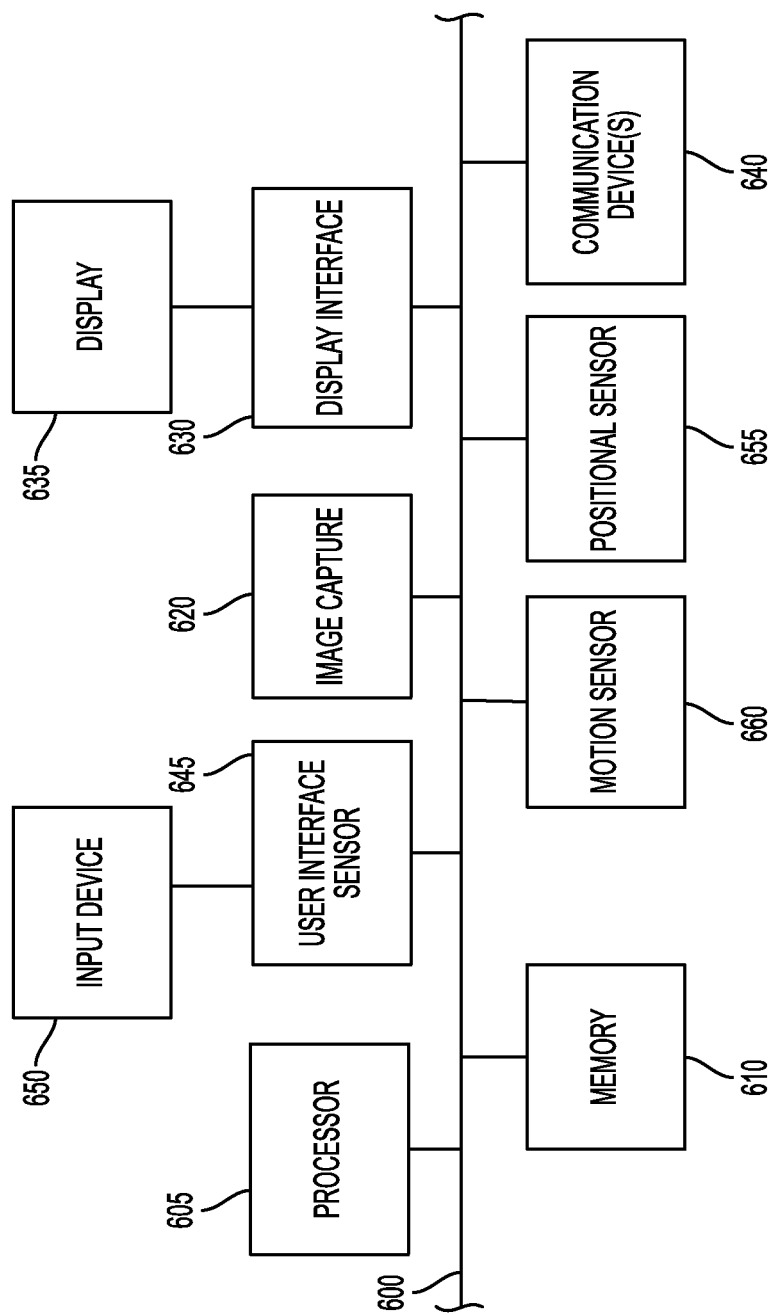
FIG. 6 depicts various embodiments of one or more electronic device for implementing the various methods and processes described herein.

FIG. 6 depicts an example of internal hardware that may be included in any of the electronic components of the system, such as the MFD, the user electronic device, or the remote server. An electrical bus 600 serves as an information highway interconnecting the other illustrated components of the hardware. Processor 605 is a central processing device of the system, configured to perform calculations and logic operations required to execute programming instructions. As used in this document and in the claims, the terms "processor" and "processing device" may refer to a single processor or any number of processors in a set of processors. Read only memory (ROM), random access memory (RAM), flash memory, hard drives and other devices capable of storing electronic data constitute examples of memory devices 610. A memory device may include a single device or a collection of devices across which data and/or instructions are stored.

An optional display interface 630 may permit information from the bus 600 to be displayed on a display device 645 in visual, graphic or alphanumeric format. An audio interface and audio output (such as a speaker) also may be provided. Communication with external devices may occur using various communication devices 640 such as a transmitter and/or receiver, antenna, an RFID tag and/or short-range or near-field communication circuitry. A communication device 640 may be attached to a communications network, such as the Internet, a local area network or a cellular telephone data network.

The hardware may also include a user interface sensor 645 that allows for receipt of data from input devices 650 such as a keyboard, a mouse, a joystick, a touchscreen, a remote control, a pointing device, a video input device and/or an audio input device. Data also may be received from an imaging capturing device 620 such of a scanner or camera. A positional sensor 655 and motion sensor 660 may be included to detect position and movement of the device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method of using image processing to automatically identify and complete a fill-in field of a printed form document, the method comprising:
by an electronic device having a processing device, executing programming instructions that cause the processing device to:
receive an image file of a printed form having at least one fill-in field that contains a handwritten symbol within a field boundary,
process the image file using a computer-implemented image processing function to automatically identify a fill-in field on the printed form and the handwritten symbol that is contained within the identified fill-in field,
by a communication hardware component of the electronic device:
communicatively connect to a proximate user mobile device, and
access a data file from the proximate user mobile device, wherein the data file comprises a plurality of categories and stored values,
retrieve a candidate value that corresponds to the identified handwritten symbol by:
identifying, from the data file, a category that corresponds to the handwritten symbol,
extracting the stored value for the identified category from the data file, and
using the extracted stored value as the candidate value,
insert the candidate value in the identified fill-in field, and
cause a document generation device to generate a document comprising the form with the selected candidate value displayed in the identified fill-in field.

2. The method of claim 1 wherein retrieving the candidate value comprises:
by the processor, accessing a data store and retrieving, from the data store, a plurality of candidate values that correspond to the identified handwritten symbol;
displaying the plurality of candidate values in a pop-up menu display sector of a display device of the electronic device;
receiving, via a touch sensor module of the display device in the pop-up menu display sector, a user selection of one of the candidate values.

3. The method of claim 1, wherein processing the image file to identify the identified fill-in fields on the printed form comprises processing the image file to:
identify an area having a non-alphanumeric symbol and a background of a color that corresponds to a known fill-in field color; and
identify a boundary of the area as the field boundary.

4. The method of claim 1 further comprising, by an image capturing device:
capturing an image of the printed form; and
saving the image as the image file in a computer-readable memory device.

5. The method of claim 1 wherein:
the document generation device comprises the processing device; and
causing the document generation device to generate the document comprising the form with the selected candidate value displayed in the identified fill-in field comprises generating an updated image file configured to cause a display device to display the form with the selected candidate value displayed in the identified fill-in field.

6. The method of claim 1 wherein:
the document generation device comprises a print device; and
causing the document generation device to generate the document comprising the form with the selected candidate value comprises generating a print file configured to cause the print device to print, on a substrate, the form with the selected candidate value displayed in the identified fill-in field.

7. The method of claim 1 wherein:
the electronic device comprises a multifunction device;
the multifunction device further comprises an image scanner and a print device;
the method further comprises:
by the image scanner, capturing the image of the printed form, and
by the processing device, generating the image file from the captured image; and
causing the document generation device to generate the document comprising the form with the selected candidate value comprises causing the print device to print,

9 on a substrate, the form with the selected candidate value displayed in the identified fill-in field.

8. The method of claim 7, wherein:
the substrate comprises the printed form; and
causing the print device to print the form on the substrate also comprises causing the print device to remove the handwritten symbol from the fill-in field by erasing or overwriting the handwritten symbol.

9. The method of claim 1, wherein:
the electronic device further comprises a touch-sensitive display device;
the method further includes, after processing the image file and before retrieving the candidate value:
causing the touch-sensitive display device to display the printed form, and
receiving, via the touch-sensitive display device, a user selection of the identified fill-in field so that when retrieving the candidate value that corresponds to the identified handwritten symbol, the processing device does so in response to receiving the user selection of the identified fill-in field.

10. A fill-in form document completion system, comprising:
a processing device;
an image capturing device;
one or more communications hardware components; and
a non-transitory computer-readable medium containing programming instructions that are configured to cause the processing device to:
receive, from the image capturing device, an image file of a printed form having at least one fill-in field that contains a handwritten symbol within a field boundary,
process the image file to identify a fill-in field on the printed form and the handwritten symbol that is contained within the identified fill-in field,
communicatively connect the system to a proximate user mobile device via the one or more communications hardware components,
access a data file from the proximate user mobile device, wherein the data file comprises a plurality of categories and stored values,
retrieve a candidate value that corresponds to the identified handwritten symbol by:
identifying, from the data file, a category that corresponds to the handwritten symbol,
extracting the stored value for the identified category from the data file, and
using the extracted stored value as the candidate value,
insert the candidate value in the identified fill-in field, and
cause a document generation device to generate a document comprising the form with the selected candidate value displayed in the identified fill-in field.

11. The system of claim 10 wherein:
the system further comprises a touch-sensitive display device;
the instructions to retrieve the candidate value comprise instructions to:
cause the processor to access a data store and retrieve, from the data store, a plurality of candidate values that correspond to the identified handwritten symbol, and

10 cause the touch-sensitive display device to display the plurality of candidate values in a pop-up menu display sector; and
the instructions to insert the selected candidate value in the identified fill-in field comprise instructions to do so in response to detecting, via the touch sensitive display device in the pop-up menu display sector, a user selection of one of the candidate values.

12. The system of claim 10, wherein the instructions to process the image file to identify the identified fill-in fields on the printed form comprise instructions to process the image file to:
identify an area having a non-alphanumeric symbol and a background of a color that corresponds to a known fill-in field color; and
identify a boundary of the area as the field boundary.

13. The system of claim 10, wherein:
the system further comprises a display device;
the document generation device comprises the processing device; and
the instructions to cause the document generation device to generate the document comprising the form with the selected candidate value displayed in the identified fill-in field comprises instructions to cause the processing device to generate an updated image file configured to cause the display device to display the form with the selected candidate value displayed in the identified fill-in field.

14. The system of claim 10 wherein:
the document generation device comprises a print device; and
the instructions to cause the document generation device to generate the document comprising the form with the selected candidate value comprises instructions to cause the processing device to generate a print file configured to cause the print device to print, on a substrate, the form with the selected candidate value displayed in the identified fill-in field.

15. The system of claim 10 wherein:
the image capturing device is a component of a multi-function device that further comprises an image scanner and a print device;
the programming instructions are further configured to:
cause the image scanner to capture the image of the printed form, and
cause the processing device to generate the image file from the captured image;
the instructions to cause the document generation device to generate the document comprising the form with the selected candidate value comprise instructions to cause the print device to print, on a substrate, the form with the selected candidate value displayed in the identified fill-in field.

16. The system of claim 15, wherein:
the substrate comprises the printed form; and
the instructions to cause the print device to print the form on the substrate also comprise instructions to cause the print device to remove the handwritten symbol from the fill-in field by erasing or overwriting the handwritten symbol.

17. The system of claim 10, wherein:
the electronic device further comprises a touch-sensitive display device;
the system also include programming instructions configured to, after processing the image file and before retrieving the candidate value:

cause the touch-sensitive display device to display the printed form, and
receive, via the touch-sensitive display device, a user selection of the identified fill-in field so that when retrieving the candidate value that corresponds to the identified handwritten symbol, the processing device does so in response to receiving the user selection of the identified fill-in field.

18. A fill-in form document completion system, comprising:
   a processing device;
   an image capturing device;
   a document generation device;
   one or more communications hardware components; and
   a non-transitory computer-readable medium containing programming instructions that are configured to cause the processing device to:
      receive, from the image capturing device, an electronic representation of a printed form having at least one fill-in field that contains a handwritten symbol within a field boundary,
      process the electronic representation file to identify a fill-in field on the printed form and the handwritten symbol that is contained within the identified fill-in field,
      communicatively connect the system to a proximate user mobile device via the one or more communications hardware components,
      access a data file from the proximate user mobile device, wherein the data file comprises a plurality of categories and stored values,
      retrieve a candidate value that corresponds to the identified handwritten symbol by:
         identifying, from the data file, a category that corresponds to the handwritten symbol,
         retrieving the stored value for the identified category from the data file, and
         using the extracted stored value as the candidate value,
      insert the candidate value in the identified fill-in field, and
      cause the document generation device to generate a document comprising the form with the selected candidate value displayed in the identified fill-in field.

19. A fill-in form document completion system, comprising:
   a processing device;
   an image capturing device;
   a touch-sensitive display device; and
   a non-transitory computer-readable medium containing programming instructions that are configured to cause the processing device to:
      receive, from the image capturing device, an image file of a printed form having at least one fill-in field that contains a handwritten symbol within a field boundary,
      process the image file to identify a fill-in field on the printed form and the handwritten symbol that is contained within the identified fill-in field,
      after processing the image file:
         cause the touch-sensitive display device to display the printed form, and
         receive, via the touch-sensitive display device, a user selection of the identified fill-in field,
         in response to receiving the user selection of the identified fill-in field, retrieve a candidate value that corresponds to the identified handwritten symbol,
         insert the candidate value in the identified fill-in field, and
         cause a document generation device to generate a document comprising the form with the selected candidate value displayed in the identified fill-in field.

20. The system of claim 19, wherein:
   the instructions to retrieve the candidate value comprise instructions to:
      cause the processor to access a data store and retrieve, from the data store, a plurality of candidate values that correspond to the identified handwritten symbol, and
      cause the touch-sensitive display device to display the plurality of candidate values in a pop-up menu display sector; and
   the instructions to insert the selected candidate value in the identified fill-in field comprise instructions to do so in response to detecting, via the touch sensitive display device in the pop-up menu display sector, a user selection of one of the candidate values.

21. The system of claim 19, wherein the instructions to process the image file to identify the identified fill-in fields on the printed form comprise instructions to process the image file to:
   identify an area having a non-alphanumeric symbol and a background of a color that corresponds to a known fill-in field color; and
   identify a boundary of the area as the field boundary.

22. The system of claim 19, wherein:
   the system further comprises a display device;
   the document generation device comprises the processing device; and
   the instructions to cause the document generation device to generate the document comprising the form with the selected candidate value displayed in the identified fill-in field comprises instructions to cause the processing device to generate an updated image file configured to cause the display device to display the form with the selected candidate value displayed in the identified fill-in field.

23. The system of claim 19, wherein:
   the document generation device comprises a print device; and
   the instructions to cause the document generation device to generate the document comprising the form with the selected candidate value comprises instructions to cause the processing device to generate a print file configured to cause the print device to print, on a substrate, the form with the selected candidate value displayed in the identified fill-in field.

24. The system of claim 19, wherein:
   the image capturing device is a component of a multi-function device that further comprises an image scanner and a print device;
   the programming instructions are further configured to:
      cause the image scanner to capture the image of the printed form, and
      cause the processing device to generate the image file from the captured image;
   the instructions to cause the document generation device to generate the document comprising the form with the selected candidate value comprise instructions to cause the print device to print, on a substrate, the form with the selected candidate value displayed in the identified fill-in field.

25. The system of claim 24, wherein:
the substrate comprises the printed form; and
the instructions to cause the print device to print the form on the substrate also comprise instructions to cause the print device to remove the handwritten symbol from the fill-in field by erasing or overwriting the handwritten symbol.

* * * * *